US012654219B1

(12) United States Patent
Nestor, III et al.

(10) Patent No.: US 12,654,219 B1
(45) Date of Patent: Jun. 16, 2026

(54) METHODS FOR FORMING A WICK

(71) Applicant: Westinghouse Electric Company LLC, Cranberry Township, PA (US)

(72) Inventors: Christopher M. Nestor, III, Murrysville, PA (US); Tyler Imprescia, Cranberry Township, PA (US); John Lojek, III, Latrobe, PA (US); Michael A. LaPresti, Greensburg, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 18/827,727

(22) Filed: Sep. 7, 2024

(51) Int. Cl.
  B21D 53/06 (2006.01)
  B23Q 3/06 (2006.01)
  F28D 15/04 (2006.01)

(52) U.S. Cl.
  CPC .............. B21D 53/06 (2013.01); B23Q 3/06 (2013.01); *B23P 2700/09* (2013.01); *F28D 15/04* (2013.01)

(58) Field of Classification Search
  CPC ................................ B21D 53/06; F28D 15/04
  See application file for complete search history.

(56) References Cited

U.S. PATENT DOCUMENTS

| | | | | | |
|---|---|---|---|---|---|
| 2,703,334 | A | * | 3/1955 | Clough | C23C 14/26 |
| | | | | | 219/76.1 |
| 4,196,504 | A | * | 4/1980 | Eastman | F28D 15/046 |
| | | | | | 29/890.032 |
| 4,817,259 | A | * | 4/1989 | Hata | B21C 23/22 |
| | | | | | 29/523 |
| 6,007,943 | A | * | 12/1999 | Coetzer | H01M 10/39 |
| | | | | | 429/105 |
| 12,007,171 | B1 | * | 6/2024 | Reid | B23K 31/027 |
| 2004/0188882 | A1 | | 9/2004 | Matsumoto et al. | |
| 2007/0034357 | A1 | | 2/2007 | Hou et al. | |
| 2011/0146955 | A1 | * | 6/2011 | Chen | C23C 26/00 |
| | | | | | 29/890.032 |
| 2019/0239395 | A1 | * | 8/2019 | Joshi | F28D 15/046 |
| 2021/0323201 | A1 | * | 10/2021 | Lojek, III | F28D 15/04 |
| 2023/0070156 | A1 | * | 3/2023 | Gross | G21C 15/257 |
| 2023/0226587 | A1 | | 7/2023 | Lojek, III et al. | |

FOREIGN PATENT DOCUMENTS

WO   2024086779 A1   4/2024

OTHER PUBLICATIONS

International Search Report and Written Opinion in corresponding International Application No. PCT/US2025/036639, mailed Oct. 8, 2025.

* cited by examiner

*Primary Examiner* — Lawrence Averick
(74) *Attorney, Agent, or Firm* — K&L Gates LLP

(57) ABSTRACT

A method of forming an annular wick for a heat pipe is disclosed. The method includes forming a plurality of layers of wick material around an elongate rod; placing the elongate rod and the layers of wick material into a central die opening of an annular die assembly; placing the rod, the layers of wick material, and the annular die assembly into a central clamp opening of a clamp, where the clamp is configured to hold the rod, the layers of wick material, and the annular die assembly together; and heating the rod, the layers of wick material, the annular die assembly, and the clamp to a temperature sufficient to thermally expand the rod toward the central die opening of the annular die assembly to compress the layers of wick material between the rod and the central die opening of the annular die assembly.

21 Claims, 14 Drawing Sheets

500

510

520

2000

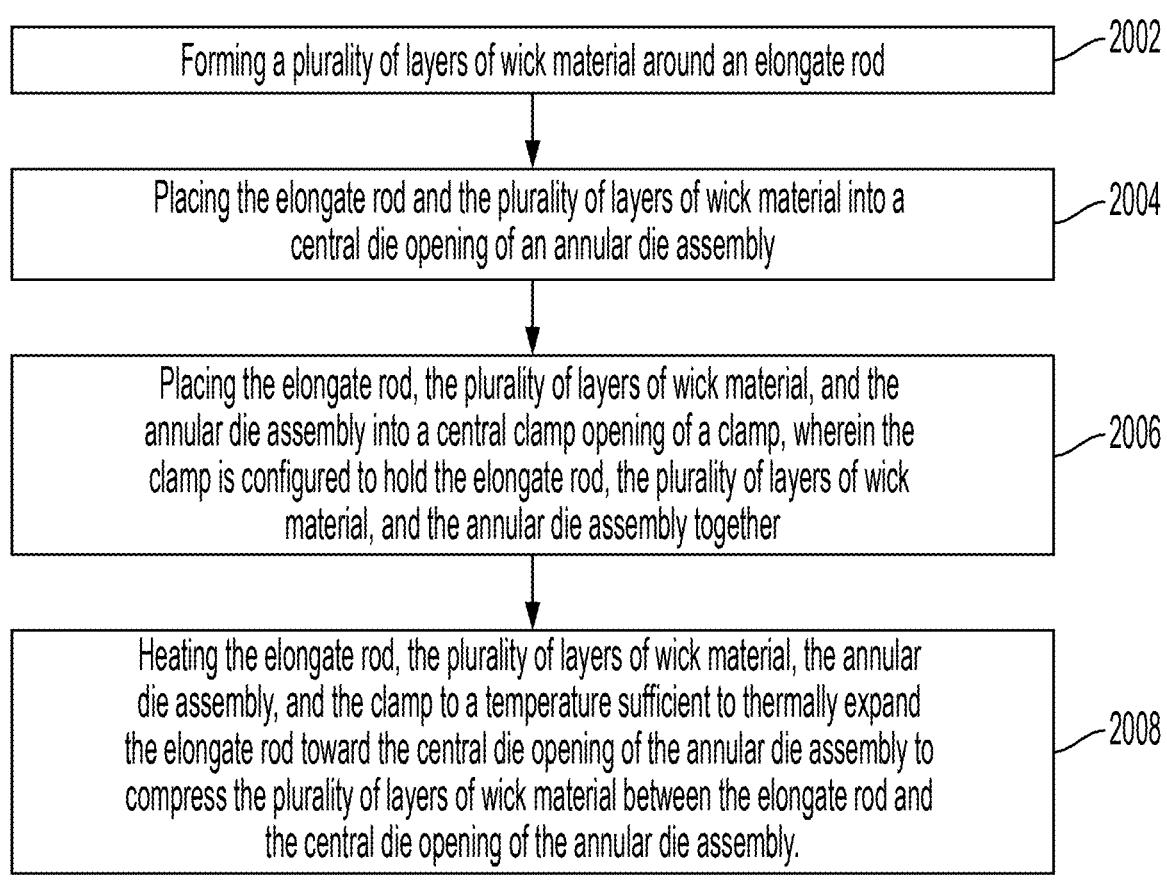

| Forming a plurality of layers of wick material around an elongate rod |
| :-- |

2002

| Placing the elongate rod and the plurality of layers of wick material into a central die opening of an annular die assembly |
| :-- |

2004

| Placing the elongate rod, the plurality of layers of wick material, and the annular die assembly into a central clamp opening of a clamp, wherein the clamp is configured to hold the elongate rod, the plurality of layers of wick material, and the annular die assembly together |
| :-- |

2006

| Heating the elongate rod, the plurality of layers of wick material, the annular die assembly, and the clamp to a temperature sufficient to thermally expand the elongate rod toward the central die opening of the annular die assembly to compress the plurality of layers of wick material between the elongate rod and the central die opening of the annular die assembly. |
| :-- |

METHODS FOR FORMING A WICK

GOVERNMENT CONTRACT

This invention was made with government support under MEITNER Award No. DE-AR0000979/DOE 2271. The government has certain rights in the invention.

FIELD

The present disclosure is generally related to wicks for use with heat pipes to facilitate heat removal and, more particularly, is directed toward devices and methods for forming an annular wick.

BACKGROUND

This invention relates generally to wicks for use with heat pipes to facilitate heat removal and, more particularly, is directed toward devices and methods for forming an annular wick for use within heat pipes.

A heat pipe is a hermetically sealed, two-phase heat transfer component used to transfer heat from a primary side (e.g., an evaporator section) to a secondary side (e.g., a condenser section). FIG. 1, as an example, illustrates a heat pipe 100 comprising the aforementioned evaporator section 102 and condenser section 106, along with an adiabatic section 104 extending therebetween. The heat pipe 100 further includes an elongate tube, a working fluid (such as water, liquid potassium, sodium, or alkali metal) and a wick 108. In operation, the working fluid is configured to absorb heat in the evaporator section 102 and vaporize. The saturated vapor, carrying latent heat of vaporization, flows towards the condenser section 106 through the adiabatic section 104. In the condenser section 106, the vapor condenses into a liquid pool 110 and gives off its latent heat. The condensed liquid is then returned to the evaporator section 102 through the wick 108 by capillary action. The aforementioned flow path of the working fluid is illustrated by segmented arrows in FIG. 1. The phase change processes and two-phase flow circulation continues as long as the temperature gradient between the evaporator and condenser sections is maintained. Due to the very high heat transfer coefficients for boiling and condensation, heat pipes are highly effective thermal conductors.

Generally during assembly of the heat pipe 100, a container lid 114 (e.g., an end cap) is utilized to seal the wick 108 and working fluid within a container 112 (e.g., an elongate tube) of the heat pipe 100. The container lid 114 includes an end plug 116 extending therefrom that is configured to couple to the wick 108 at an interface 118. It is necessary to maintain a seal at the interface 118 between the end plug 116 of the heat pipe 100 and the evaporator section 102 of the wick 108.

In nuclear systems, heat pipes are utilized by placing the evaporator section of the heat pipe within a reactor core containing nuclear fuel and the condenser section is placed near heat exchangers. The nuclear fuel heats up and vaporizes the working fluid within the heat pipe at the evaporator section and heat exchangers absorb the latent heat coming from the condenser section. Example heat pipes in nuclear applications are described in U.S. Pat. Nos. 11,650,016, 5,684,848, 6,768,781, and 10,643,756, all of which are incorporated by reference herein in their entirety.

The current process for forming capillary tubes (e.g. porous wick structures) for use in heat pipe operations is a multi-step, labor intensive process even with automation enhancements. In general, wick structures are fragile and require carefully controlled handling requirements. There is inherent risk in between each step which exposes the wick to handling damage and harmful atmospheric, environmental exposure. An example of a current wick forming process requires rolling a wick material either separately while inserting the wick into a die or captively within a die set. The wick is expanded to the shape of the die, and then has to be removed and placed in a furnace for a self-adhesion process. The expansion process generates the initial shape while the high temperature furnace provides stress relieving and self-adhesion for structural rigidity. The complexity of performing these steps become greater as the axial length of the wicks increase. As such, it may be desirable to create devices and methods of forming a wick to include forming, stress relieving, and self-adhering the wick structure all in one step within a furnace setting. In the present disclosure, devices and methods for forming a wick, such as an annular wick, are presented.

SUMMARY

The following summary is provided to facilitate an understanding of some of the innovative features unique to the aspects disclosed herein and is not intended to be a full description. A full appreciation of the various aspects can be gained by taking the entire specification, claims, and abstract as a whole.

In various aspects, a method of forming an annular wick for a heat pipe is disclosed. The method includes forming a plurality of layers of wick material around an elongate rod; placing the elongate rod and the plurality of layers of wick material into a central die opening of an annular die assembly; and placing the elongate rod, the plurality of layers of wick material, and the annular die assembly into a central clamp opening of a clamp, where the clamp is configured to hold the elongate rod, the plurality of layers of wick material, and the annular die assembly together. The method further includes heating the elongate rod, the plurality of layers of wick material, the annular die assembly, and the clamp to a temperature sufficient to thermally expand the elongate rod toward the central die opening of the annular die assembly to compress the plurality of layers of wick material between the elongate rod and the central die opening of the annular die assembly.

In various aspects, tooling for forming an annular wick from a plurality of layers of wick material is disclosed. The tooling includes: a clamp, an annular die assembly, and an elongate rod. The clamp includes a first clamp portion defining a first arcuate clamp opening and a second clamp portion defining a second arcuate clamp opening. The first clamp portion and the second clamp portion are attachable to each other such that the first arcuate clamp opening and the second arcuate clamp opening form a central clamp opening of the clamp. The annular die assembly includes a first die portion defining a first arcuate die opening and a second die portion defining a second arcuate die opening. The first die portion and the second die portion are positionable together such that the first arcuate die opening and the second arcuate die opening form a central die opening of the annular die assembly. The elongate rod is positionable in the central die opening. The plurality of layers of wick material are configured to be wrapped around the elongate rod to position the plurality of layers of wick material intermediate the elongate rod and the central die opening. The elongate rod includes a first material having a first coefficient of thermal expansion and the annular die assembly includes a second material having a second coefficient of thermal expansion that is less than the first coefficient of thermal expansion.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

FIG. 18 is a flow chart depicting a method of forming a wick, in accordance with at least one aspect of the present disclosure.

Corresponding reference characters indicate corresponding parts throughout the several views. The exemplifications set out herein illustrate various aspects of the disclosure, in one form, and such exemplifications are not to be construed as limiting the scope of the disclosure in any manner.

DETAILED DESCRIPTION

Figure 1:
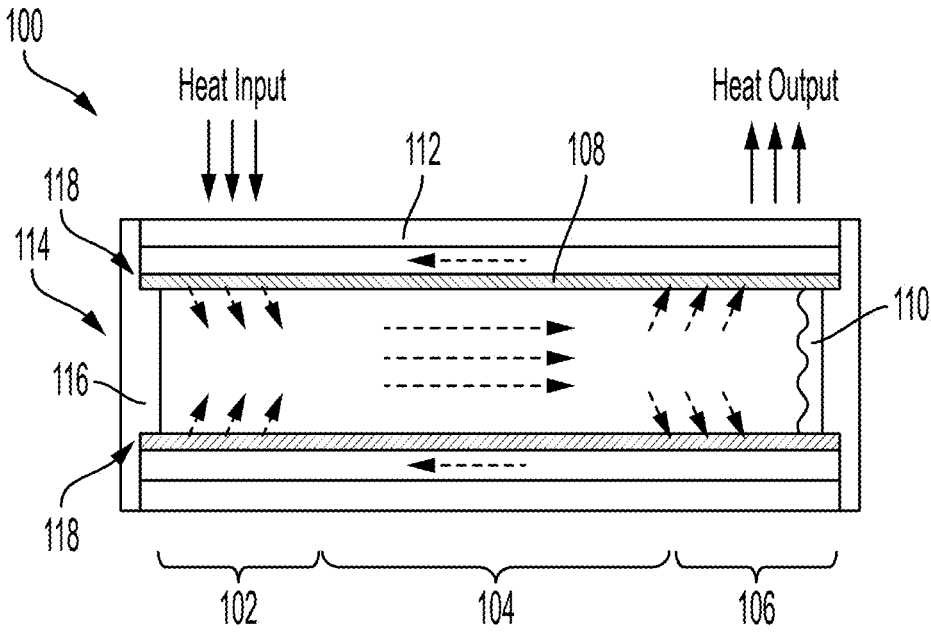
FIG. 1 is a cross-section view of a heat pipe including an annular wick, illustrating a condenser end, an evaporator end, and an adiabatic section of the heat pipe, in accordance with at least one aspect of the present disclosure.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms.

In the following description, reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Before explaining various aspects of the methods and devices for forming a wick in detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

Figure 11:
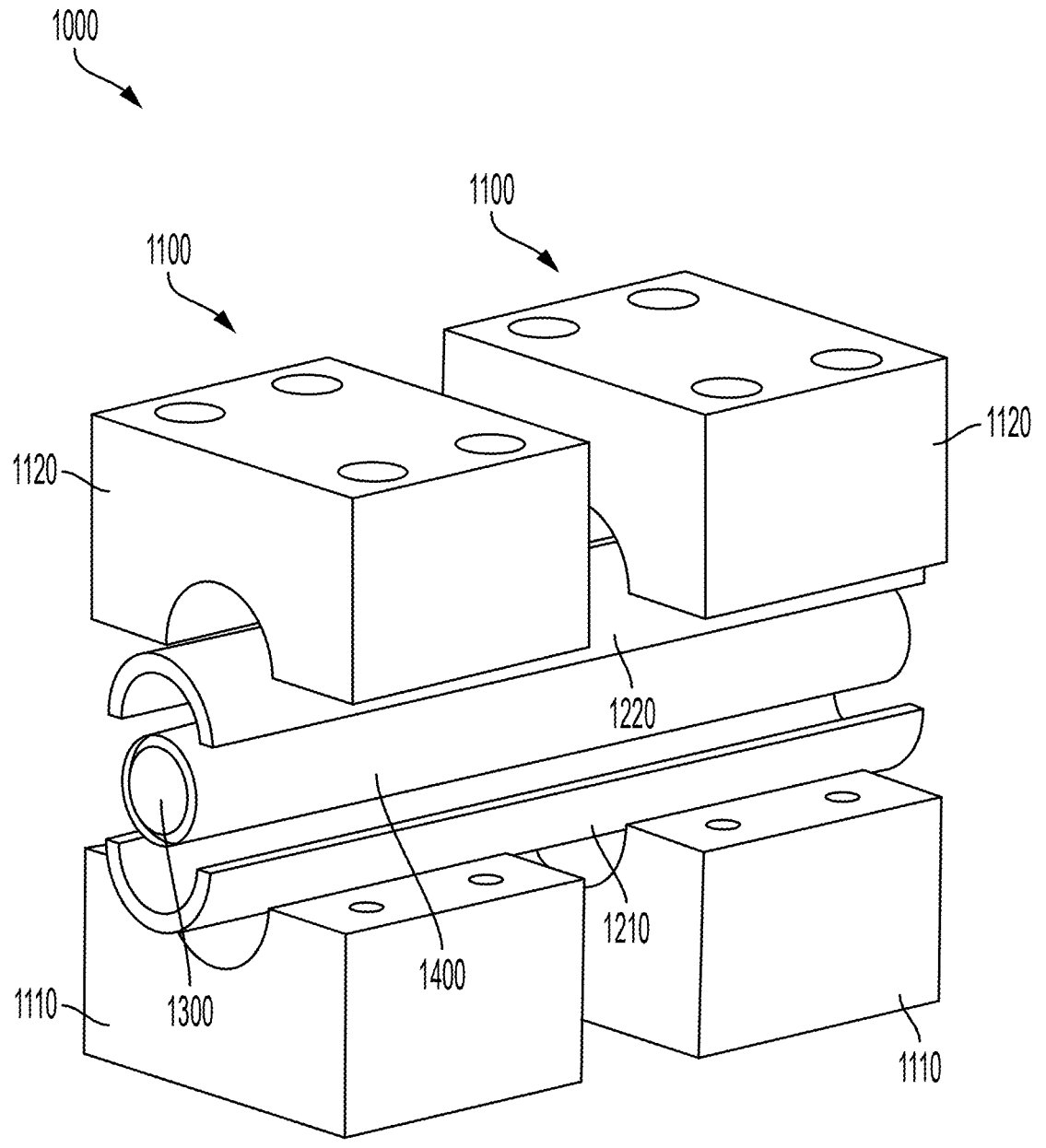
FIG. 11 is an exploded perspective view of the tooling of FIG. 2 with fasteners of the tooling removed, in accordance with at least one aspect of the present disclosure.
Figure 12:
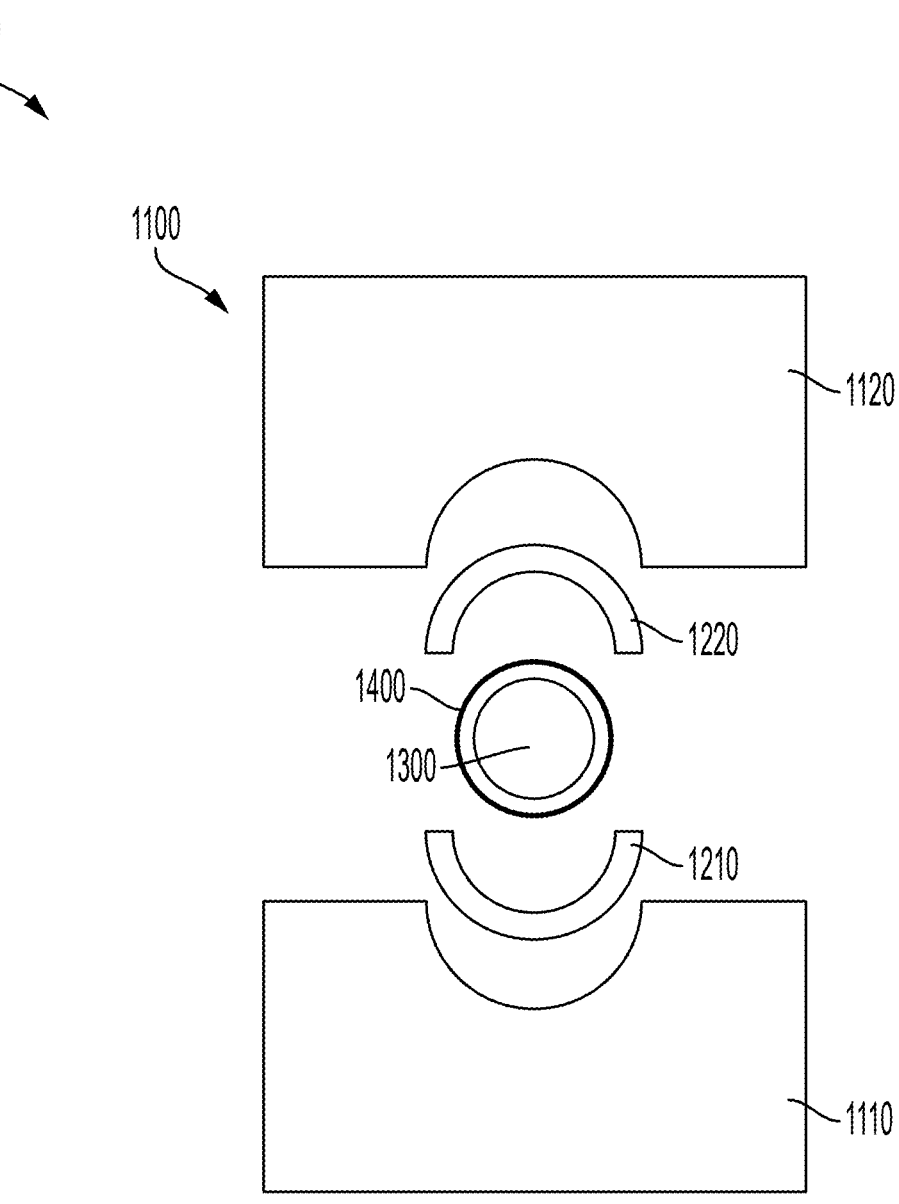
FIG. 12 is an exploded front view of the tooling of FIG. 11, in accordance with at least one aspect of the present disclosure.

The above-mentioned issues may be addressed with a device (e.g., tooling) that forms, stress relieves, and self-adheres the wick structure all in one step within a furnace setting, for example. FIGS. 2-5 illustrate tooling 1000 comprising one or more than one clamp 1100, an annular die assembly 1200, and an elongate rod 1300 (e.g., a mandrel rod). FIGS. 11 and 12 illustrate exploded views of the tooling 1000. In use, a plurality of layers of wick material 1400 are positioned around the elongate rod 1300 between the annular die assembly 1200 and the elongate rod 1300 (see FIG. 3), and the annular die assembly 1200 is held together by the one or more than one clamp 1100. In at least one aspect, each one of the one or more than one clamp 1100 is identical. In various aspects, only one clamp 1100 is used as part of the tooling 1000. In various aspects, the number of clamps 1100, the length of the elongate rod 1300, and the length of the annular die assembly 1200 depends on the axial length of plurality of layers of wick material 1400 to be formed. For example, to form an annular wick measuring six inches, only one clamp 1100 may be required. Further, to form an annular wick measuring twelve feet, a dozen or more clamps 1100 may be required. For the sake of brevity, numerous specific details of only a single clamp of the one or more than one clamp 1100 are described in greater detail below.

Figure 2:
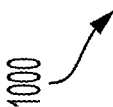
FIG. 2 is a perspective view of tooling for forming an annular wick from a plurality of layers of wick material, depicting a pair of clamps holding an annular die assembly having the plurality of layers of wick material wrapped around an elongate rod positioned within the annular die assembly, in accordance with at least one aspect of the present disclosure.
Figure 4:
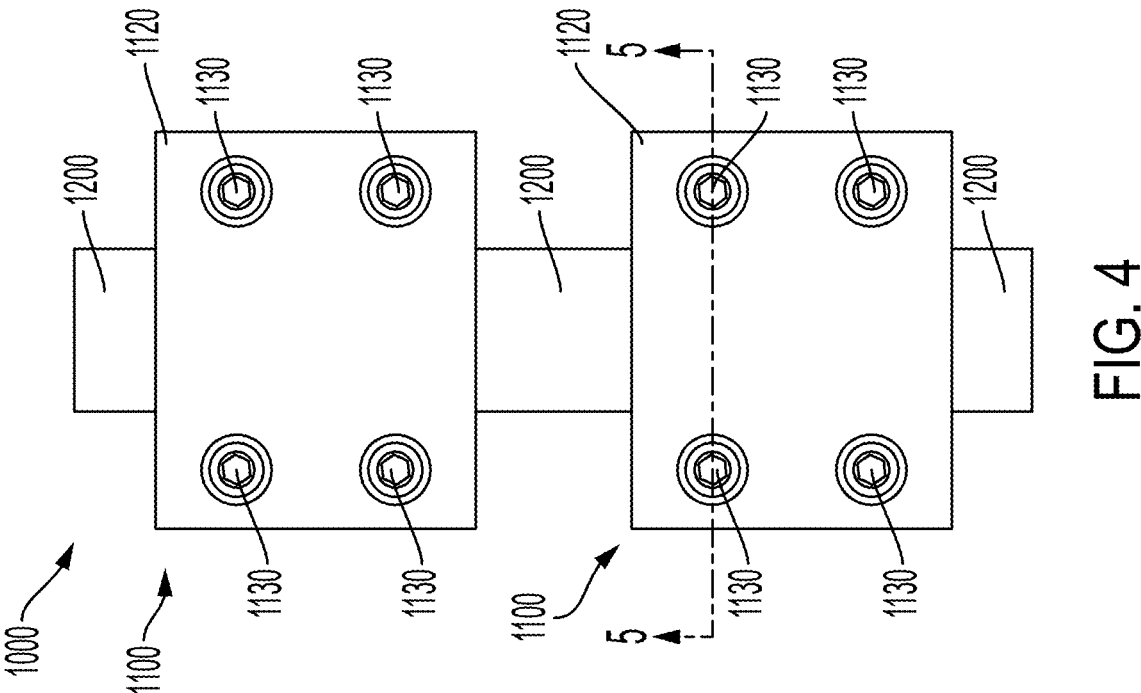
FIG. 4 is a plan view of the tooling of FIG. 2, in accordance with at least one aspect of the present disclosure.
Figure 3:
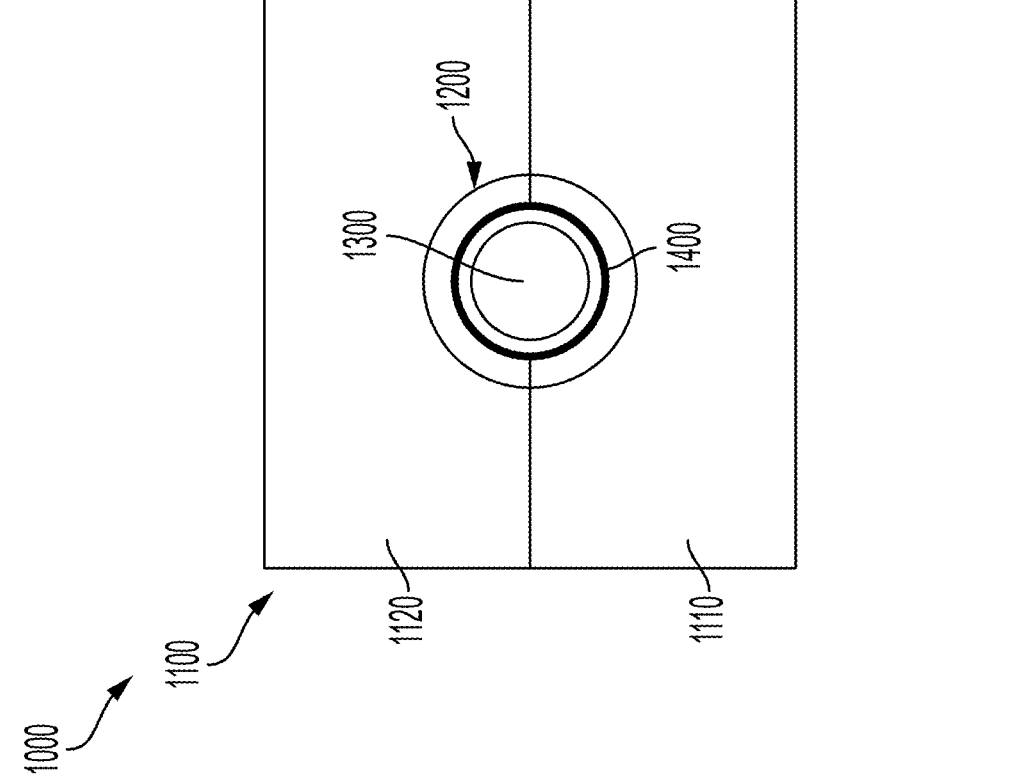
FIG. 3 is a front elevation view of the tooling of FIG. 2, in accordance with at least one aspect of the present disclosure.
Figure 5:
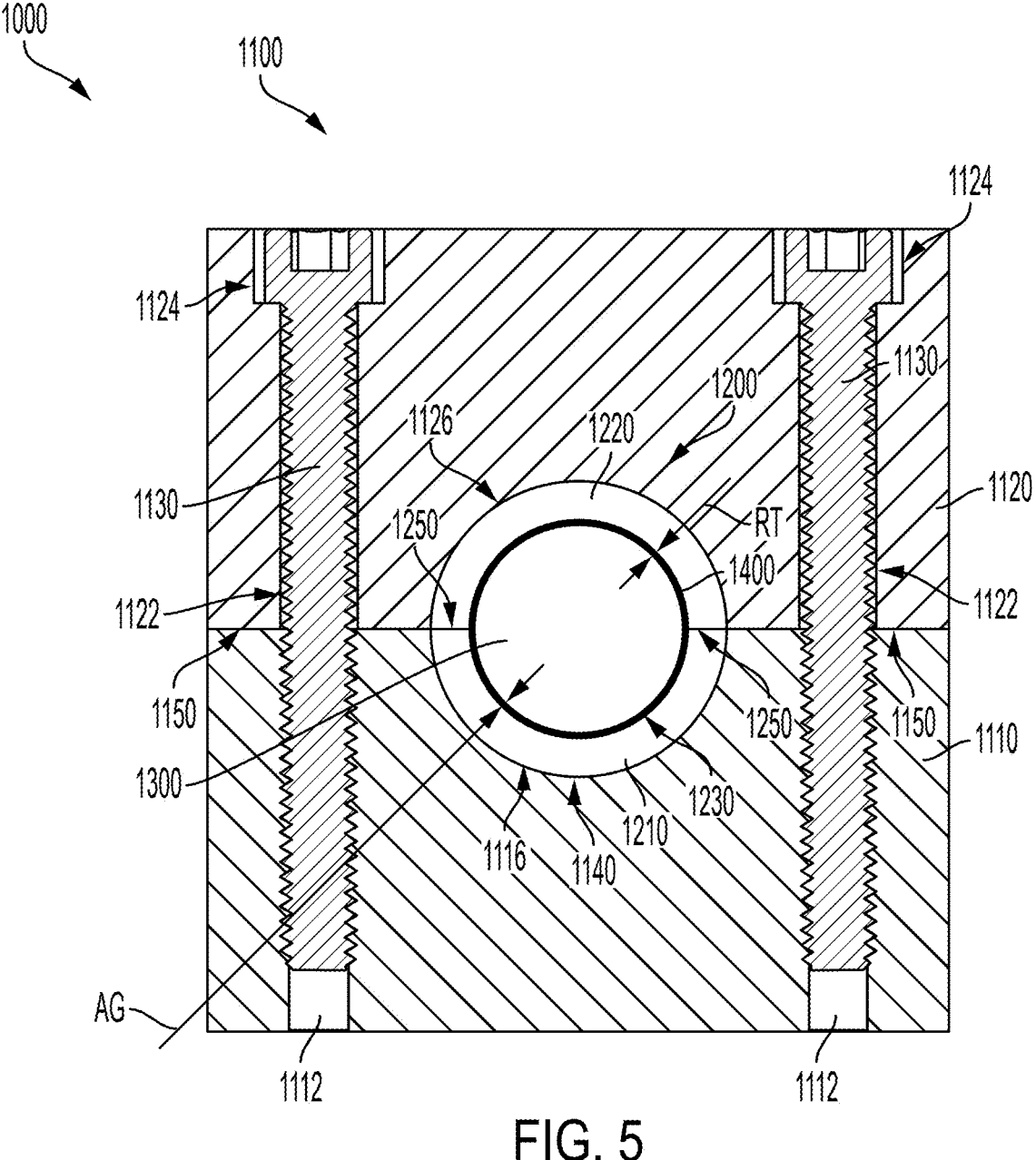
FIG. 5 is a cross section view of the tooling of FIG. 2 taken through line 5-5 in FIG. 4, depicting a pair of fasteners attaching a first clamp portion and a second clamp portion of the clamp to each other, in accordance with at least one aspect of the present disclosure.

Referring again to FIG. 2, each clamp 1100 comprises a first clamp portion 1110 and a second clamp portion 1120 that are attachable to each other by way of a plurality of fasteners 1130 (e.g., a bolt). FIG. 5 illustrates a cross-section view through one of the clamps 1100. In at least one aspect, the first clamp portion 1110 comprises a plurality of threaded holes 1112 and the second clamp portion 1120 comprises a plurality of through holes 1122 terminating in a counterbore 1124 at one end. Each of the through holes 1122 of the second clamp portion 1120 receive one of the threaded fasteners 1130 therein. Each of the threaded fasteners 1130 are threadably engageable with a corresponding one of the threaded holes 1112 of the first clamp portion 1110 to mechanically attach the first clamp portion 1110 and the second clamp portion 1120 to each other. In at least one aspect, each clamp 1100 comprises four threaded fasteners 1130 to attach the first clamp portion 1110 and the second clamp portion 1120 to each other, as shown in FIGS. 2 and 4. In at least one aspect, each clamp 1100 comprises greater than or equal to one threaded fastener 1130 and less than or equal to four threaded fasteners 1130 to attach the first clamp portion 1110 and the second clamp portion 1120 to each other. In at least one aspect, each clamp comprises more than four threaded fasteners 1130 to attach the first clamp portion 1110 and the second clamp portion 1120 to each other.

Figure 6:
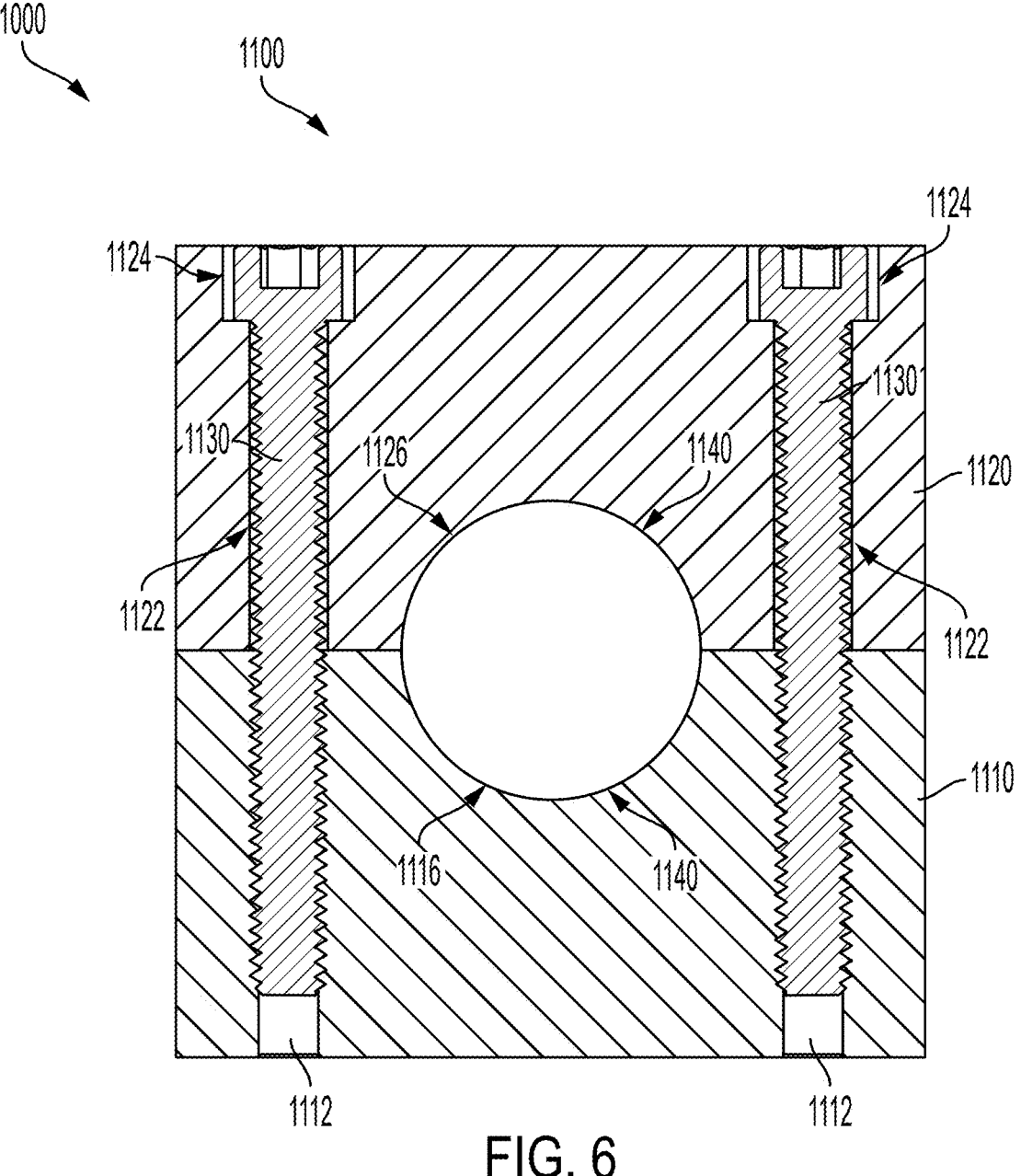
FIG. 6 is cross section view of one of the clamps of the pair of clamps of the tooling of FIG. 5, in accordance with at least one aspect of the present disclosure.

FIG. 6 illustrates the clamp 1100 without the elongate rod 1300, without the plurality of layers of wick material 1400, and without the annular die assembly 1200 positioned therein. The first clamp portion 1110 defines a first arcuate clamp opening 1116 and the second clamp portion 1120 defines a second arcuate clamp opening 1126. The first arcuate clamp opening 1116 and the second arcuate clamp opening 1126 form a central clamp opening 1140 when the first clamp portion 1110 and the second clamp portion 1120 are attached to each other. In at least one aspect, the central clamp opening 1140 is circular as shown in FIG. 6. In at least one aspect, the clamp opening is elliptical, for example. In any event, the central clamp opening 1140 of each of the one or more clamps 1100 of the tooling 1000 is to receive the annular die assembly 1200, the plurality of layers of wick material 1400, and the elongate rod 1300, as discussed in greater detail below.

Figure 8:
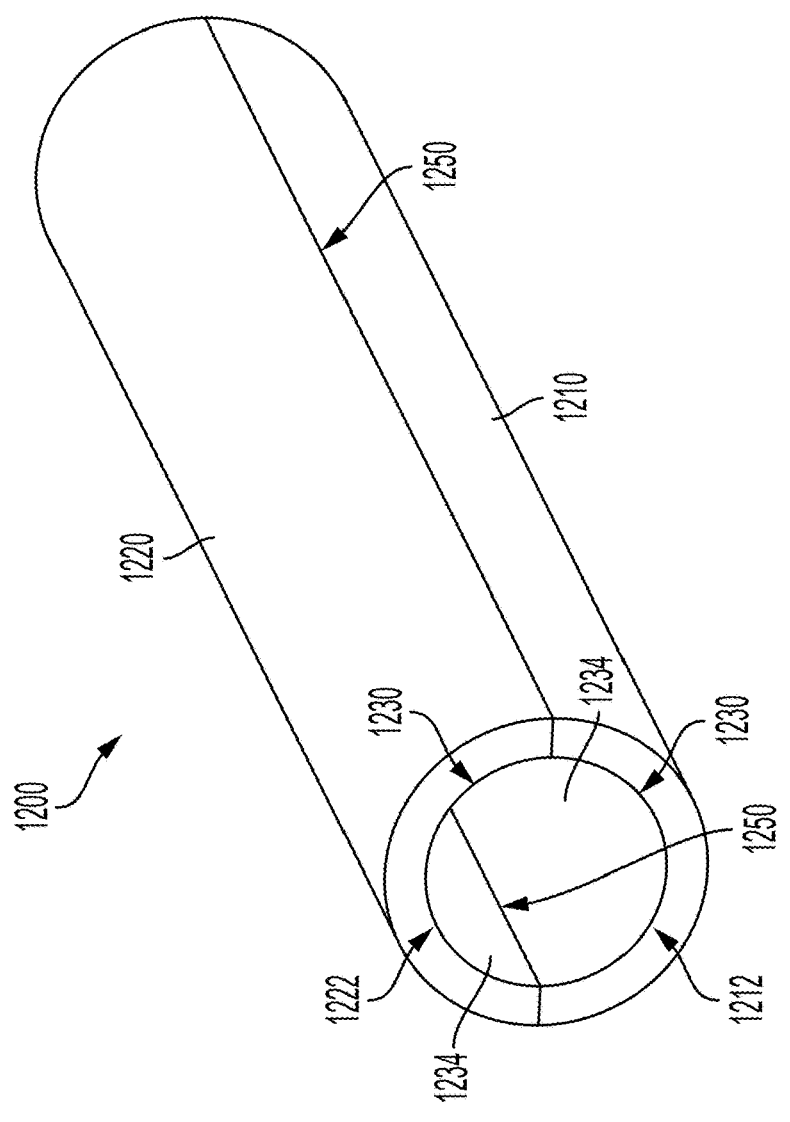
FIG. 8 is a perspective view of the annular die assembly of the tooling of FIG. 2, in accordance with at least one aspect of the present disclosure.
Figure 8:
Figure 7:
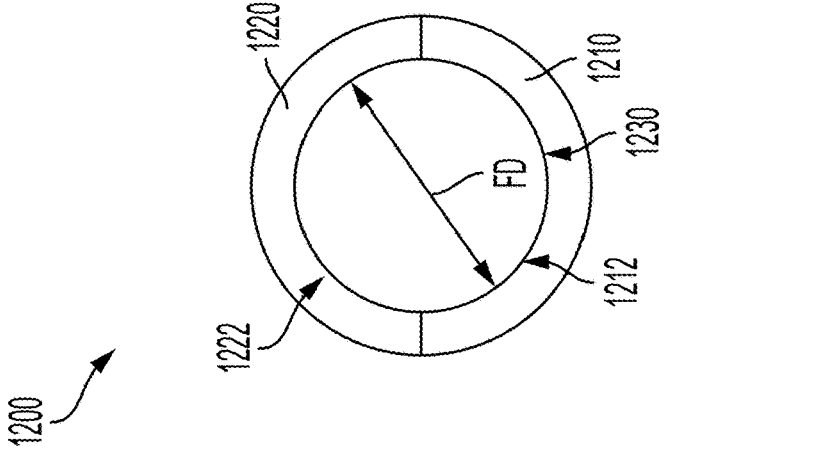
FIG. 7 is a front view of the annular die assembly of the tooling FIG. 2, in accordance with at least one aspect of the present disclosure.

Turning now to FIGS. 7 and 8, the annular die assembly 1200 comprises a first die portion 1210 defining a first arcuate die opening 1212 and a second die portion 1220 defining a second arcuate die opening 1222. The first die portion 1210 and the second die portion 1220 are positionable together, as shown in FIG. 8, such that the first arcuate die opening 1212 and the second arcuate die opening 1222 form a central die opening 1230 of the annular die assembly 1200. In at least one aspect, the central die opening 1230 is circular as shown in FIG. 7. In at least one aspect, the central die opening is elliptical, for example. In at least one aspect, the central die opening 1230 defines a first diameter FD, as shown in FIG. 7.

Figure 9:
FIG. 9 is a cross section view of one of the clamps of the pair of clamps of the tooling of FIG. 5, depicting the annular die assembly positioned in a central clamp opening of the clamp, in accordance with at least one aspect of the present disclosure.
Figure 9:
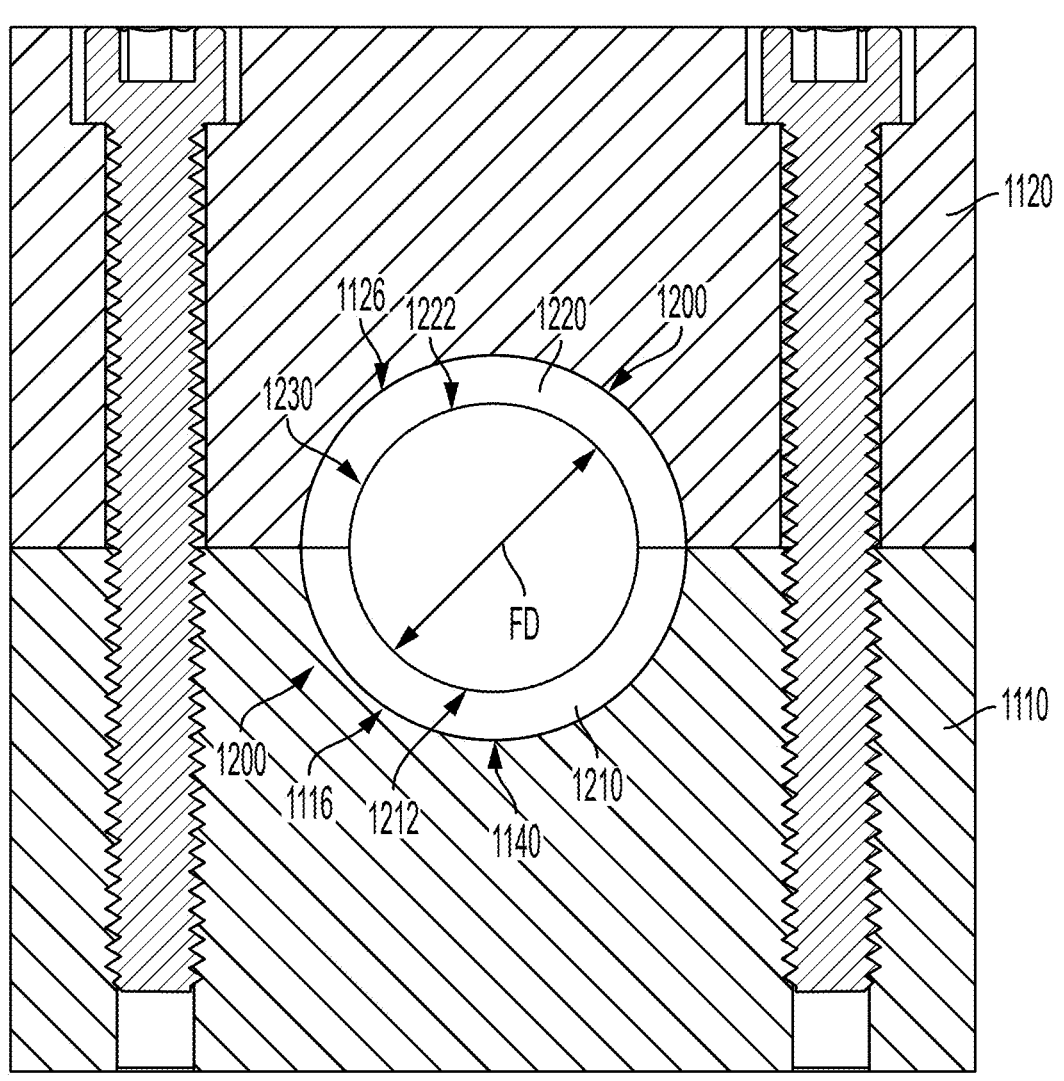

Referring to FIG. 9, which illustrates one of the clamps 1100 without the elongate rod 1300 shown and without the plurality of layers of wick material 1400 shown. The annular die assembly 1200 is positionable within the central clamp opening 1140 of the clamp 1100 such that the central die opening 1230 of the annular die assembly 1200 and the central clamp opening 1140 of the clamp 1100 are concentric.

Figure 10:
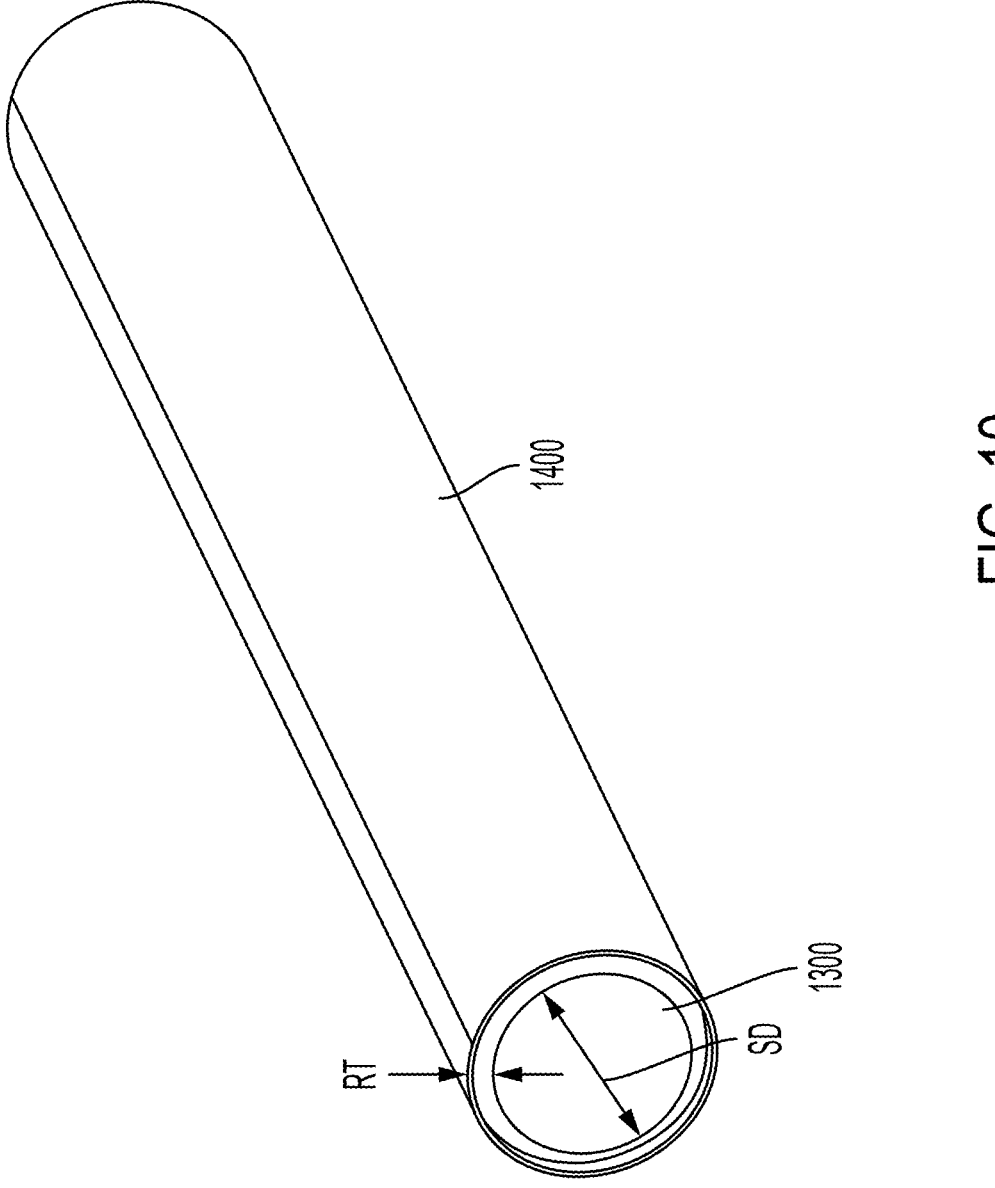
FIG. 10 is a perspective view of the plurality of layers of wick material wrapped around the elongate rod of the tooling of FIG. 2, in accordance with at least one aspect of the present disclosure.

Referring to FIG. 10, the elongate rod 1300 and the plurality of layers of wick material 1400 are shown. In at least one aspect, the elongate rod 1300 is a solid mandrel rod. In at least one aspect, the elongate rod 1300 is tubular. In any event, the elongate rod 1300 defines a second diameter SD (e.g., the outside diameter of the elongate rod 1300) as shown in FIG. 10. In various aspect, the plurality of layers of wick material 1400 comprise a sheet of material that is concentrically wrapped around the second diameter SD of the elongate rod 1300 to form multiple layers. In at least one aspect, the plurality of layers of wick material 1400 are wrapped around the second diameter SD and define a radial thickness RT as shown in FIG. 10.

Further to the above, in at least one aspect, the elongate rod 1300 comprises a first material having a first coefficient of thermal expansion and the annular die assembly 1200 comprises a second material having a second coefficient of thermal expansion that is less than the first coefficient of thermal expansion. In at least one aspect, the clamp 1100 comprises a third material having a third coefficient of thermal expansion that is less than the first coefficient of thermal expansion of the first material of the elongate rod 1300.

In at least one aspect, the wick material 1400 is an austenitic ferrous wire cloth, for example, a stainless steel wire cloth. In at least one aspect, the wick material 1400 is a flexible metal material. In at least one aspect, the wick material 1400 is an alloy of stainless steel. In at least one aspect, the wick material 1400 is a wire cloth comprising iron-chromium-aluminum (FeCrAl) material.

In at least one aspect, the first material of the elongate rod 1300 comprises at least one of stainless steel, titanium, aluminum, an aluminum alloy, or combinations thereof. In at least one aspect, the first material of the elongate rod 1300 comprises a stainless-steel alloy or similar metal with a comparable coefficient of thermal expansion. In at least one aspect, a ceramic coating, a metallic coating, a refractory alloy coating, a molybdenum coating, a titanium-zirconium-molybdenum coating, or combinations thereof, may be applied to the second diameter SD of the elongate rod 1300.

In at least one aspect, the second material of the annular die assembly 1200 comprises a ceramic, a metallic, a refractory alloy, molybdenum, a molybdenum alloy, titanium-zirconium-molybdenum (TZM), or combinations thereof. In at least one aspect, the annular die assembly 1200 is coated with a ceramic. In at least one aspect, the central die opening 1230 of the annular die assembly 1200 is coated with a ceramic. In at least one aspect, the annular die assembly 1200 comprises a ductile material made from a low thermal expansion alloy, such as Alloy 42, Invar 36, or TZM. In such instances, the central die opening 1230 of the annular die assembly 1200 may be coated with a protective ceramic coating or refractory alloy, for example.

In at least one aspect, the third material of the one or more than one clamp 1100 comprises at least one of a ceramic, a metallic, a refractory alloy, a nickel-based alloy, Alloy 42, Invar 36, molybdenum, a molybdenum alloy, titanium-zirconium-molybdenum (TZM), or combinations thereof.

Figure 13:
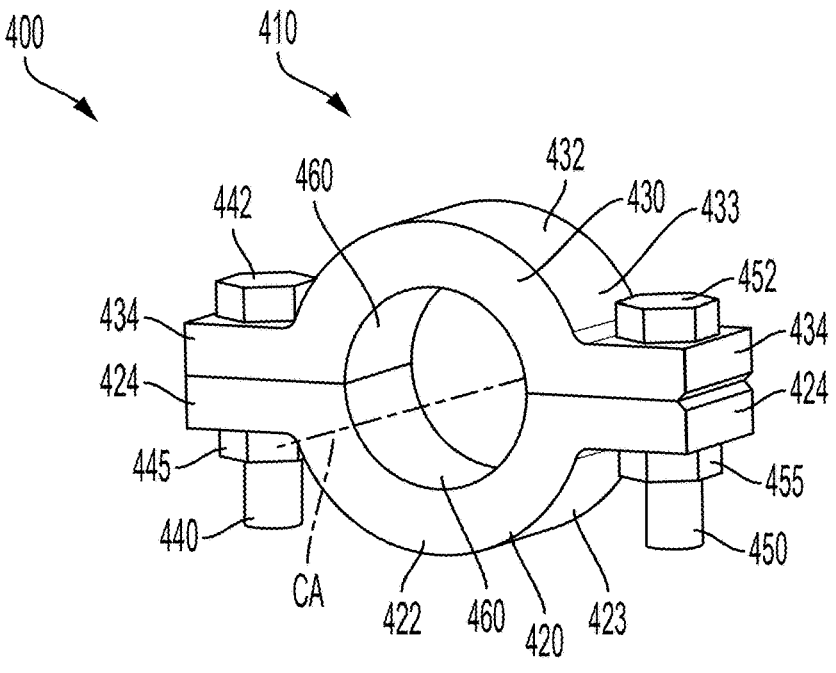
FIG. 13 is a perspective view of another clamp for attaching a wick plug to an annular wick, in accordance with at least one aspect of the present disclosure.
Figure 14:
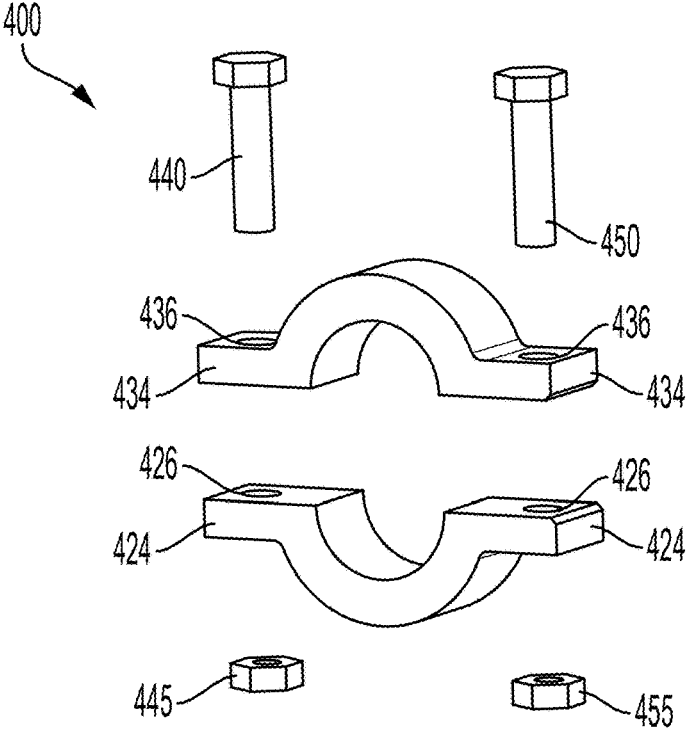
FIG. 14 is an exploded view of the clamp of FIG. 13, in accordance with at least one aspect of the present disclosure.

FIGS. 13 and 14 illustrate a clamp 400 comprising a two-piece clamp body 410, a first bolt 440, a second bolt 450, a first nut 445, and a second nut 455. The two-piece clamp body 410 comprises a first clamp portion 420 and a second clamp portion 430 attachable to each other to from the two-piece clamp body 410. In at least one aspect, the first clamp portion 420 and the second clamp portion 430 define an inner diameter 460 when the first clamp portion 420 and the second clamp portion 430 are attached to each other. The inner diameter 460 defines a central axis CA, as shown in FIG. 13.

Further to the above, the first clamp portion 420 comprises a first arcuate body 422 and the second clamp portion comprises a second arcuate body 432. The first arcuate body 422 defines a first arcuate exterior surface 423 and the second arcuate body 432 defines a second arcuate exterior surface 433. When the first clamp portion 420 is attached to the second clamp portion 430, the first arcuate exterior surface 423 and the second arcuate exterior surface 433 are concentric with the inner diameter 460 and centered about the center axis CA.

Further to the above, the first clamp portion 420 comprises a pair of first lugs 424 extending from either side of the first arcuate body 422. Similarly, the second clamp portion 430 comprises a pair of second lugs 434 extending from either side of the second arcuate body 432. Each of the first lugs 424 define a first through hole 426 and each of the second lugs 434 define a second through hole 436. In various aspects, the first lugs 424 are coupled to their respective second lugs 434 to attach the first clamp portion 420 and the second clamp portion 430 to each other, as discussed in greater detail below.

In use, to attach the first clamp portion 420 and the second clamp portion 430 together, the first lugs 424 are aligned and engaged with their respective second lugs 434, the first through holes 426 are aligned with their respective second through holes 436, and the first bolt 440 and the second bolt 450 are positioned through the through holes 426, 436 as shown in FIG. 13. In at least one aspect, the bolts 440, 450 comprise a sufficient length to extend through the through holes 426, 436. In any event, the first nut 445 can then be threaded onto the first bolt 440 to capture the lugs 424, 434 between the first nut 445 and a first head 442 of the first bolt 440. Similarly, the second nut 455 can be threaded onto the second bolt 450 to capture the lugs 424, 434 between the second nut 455 and a second head 452 of the second bolt 450.

Figure 15:
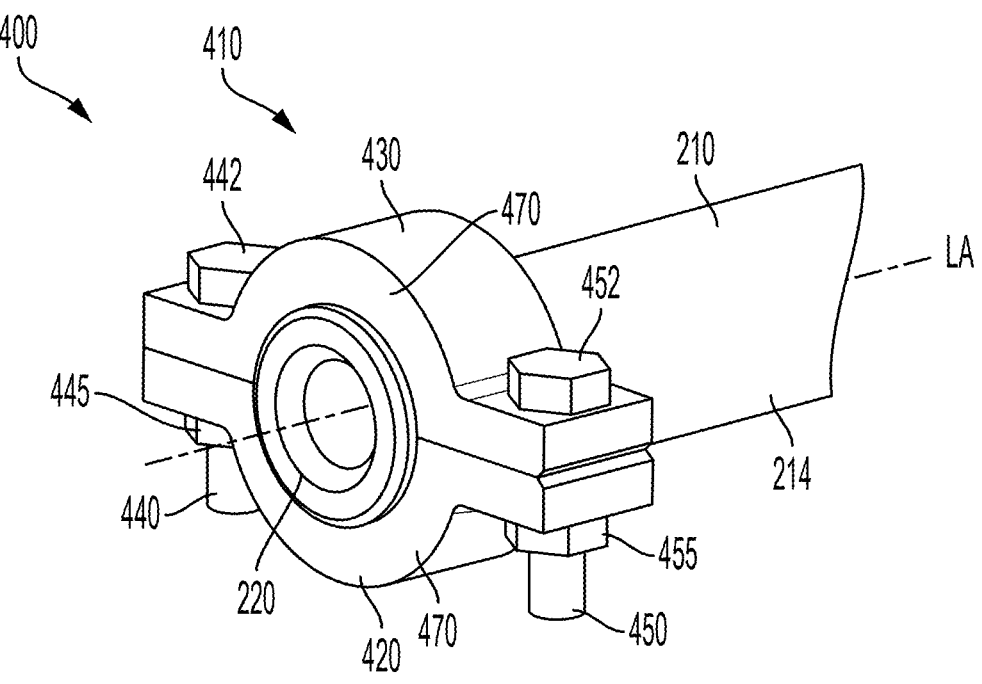
FIG. 15 is a perspective view of the clamp of FIG. 13, depicting the clamp positioned onto an outside diameter of the annular wick with the wick plug positioned at least partially within the annular wick, in accordance with at least one aspect of the present disclosure.

FIG. 15 illustrates the clamp 400 positioned onto the outside diameter 214 of the annular wick 210 with the wick plug 220 positioned, at least partially, within the annular wick 210. In at least one aspect, the nuts 445, 455 may be loosened to space the first clamp portion 420 and the second clamp portion 430 apart so that the clamp 400 can fit over the annular protrusion 226 of the wick plug 220. In at least one aspect, the clamp 400 is positioned around and clamped onto the outside diameter 214 of the annular wick 210 such that a face 470 of the clamp 400 abuts the annular protrusion 226. In any event, the nuts 445, 455 can be tightened as the bolt heads 442, 452 are held stationary (or vice versa) in order to clamp the clamp 400 onto the outside diameter 214 of the annular wick 210. In at least one aspect, the central axis CA defined by the inner diameter 460 of the clamp 400 is colinear with the longitudinal axis LA of the annular wick 210 and the wick plug 220 when the clamp 400 is clamped onto the annular wick 210, as shown in FIG. CC.

Further to the above, in at least one aspect, the inner diameter 460 of the clamp 400 is equal to or less than 0.010 inch greater than the outside diameter 214 of the annular wick 210. In at least one aspect, the inner diameter 460 of the clamp 400 is 0.001 inch greater than the outside diameter 214 of the annular wick 210. In at least one aspect, the inner diameter 460 of the clamp 400 is 0.010 inch greater than the outside diameter 214 of the annular wick 210. In at least one aspect, the inner diameter 460 of the clamp 400 is between 0.001 inch and 0.010 inch greater than the outside diameter 214 of the annular wick 210.

Figure 16:
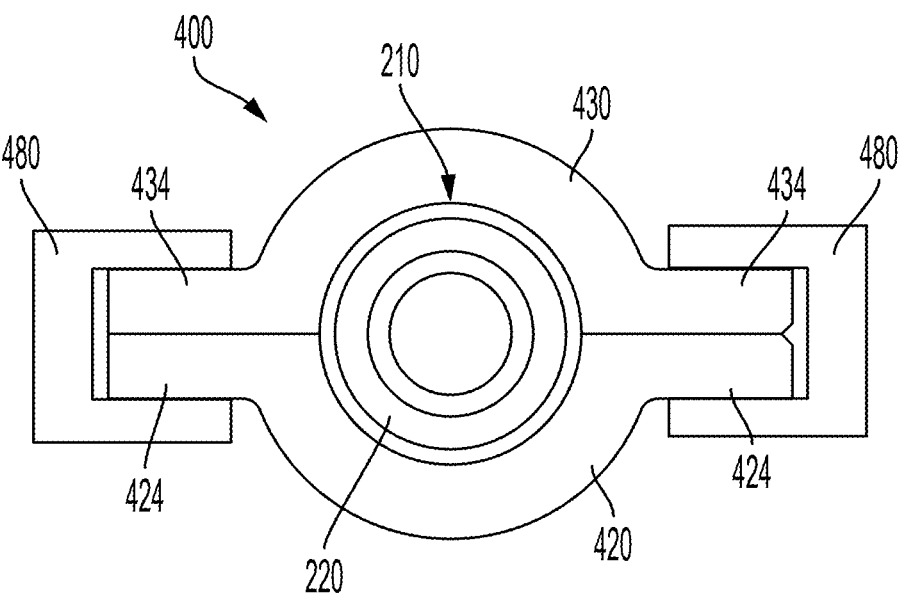
FIG. 16 a front view of the clamp of FIG. 13 without nuts and bolts, depicting a mechanical clamp positioned on lugs of the clamp, in accordance with at least one aspect of the present disclosure.

Turning now to FIG. 16, in certain instances, the clamp 400 may not require nuts and/or bolts to attach the first clamp portion 420 and the second clamp portion 430 together. In such instances, a mechanical clamp, such as the mechanical clamp 480 shown in FIG. 16, can be slid onto the lugs 424, 434, on one or more sides of the clamp 400, to hold the first clamp portion 420 and the second clamp portion 430 together. In at least one aspect, the mechanical clamp 480 may be spring loaded. In at least one aspect, the mechanical clamp 480 may be made of a flexible material that can be flexed outward and then clamped onto the lugs 424, 434, for example.

Figure 17:
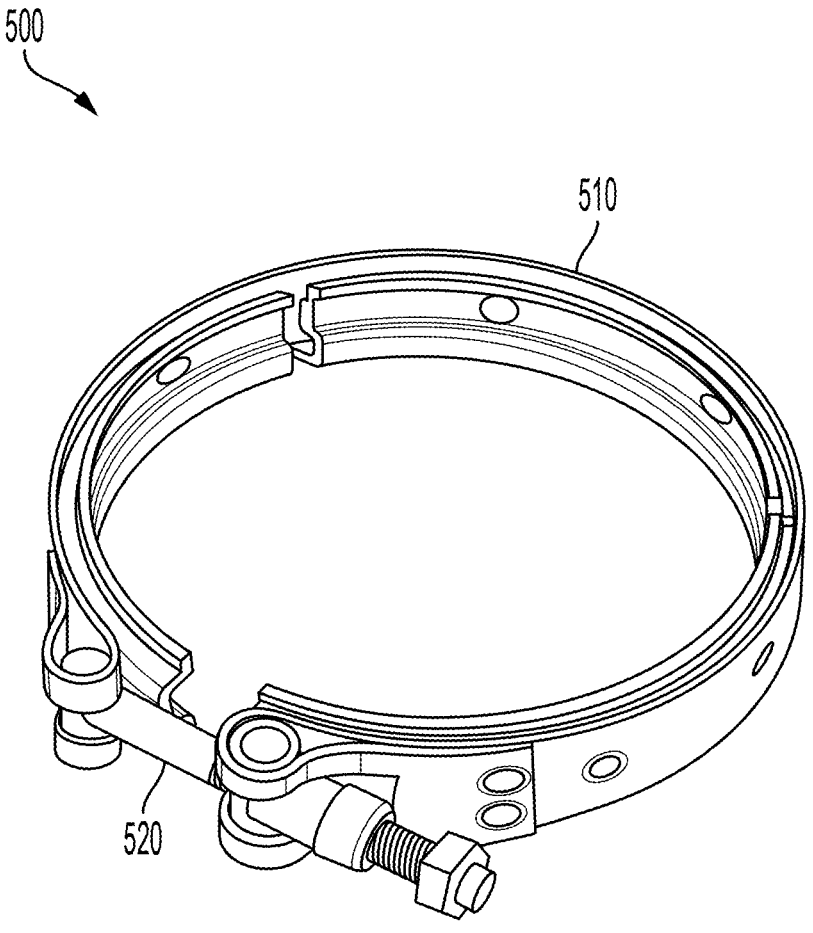
FIG. 17 is a perspective view of a clamp with an embedded stud in accordance with at least one aspect of the present disclosure.

FIG. 17 illustrates a clamp 500 comprising a clamp body 510 and a first stud 520. In one or more than one aspect of the clamp 500, the clamp body 510 may be a single band of material. For example, the clamp body may comprise a metal, a plastic, or a composite material. The first end of the clamp body 510 connects to the second end of the clamp body 510 by means of a fastener. The fastener may be a stud. The stud 520 may be captured at a first end by the clamp body 510. The second end of the stud 520 is threaded through an opposite end of the claim body 510. Alternatively, the second end of the stud 520 may be threaded through a nut (not shown) that will similarly tighten the clamp body 510 around the annular die as the nut is threaded onto the stud 520. Other embodiments may include a plurality of sections of a clamp body, each of the plurality of sections capturing a stud that connects each section with an adjacent section.

In one or more aspects of the disclosure, the clamp 500 comprises a clamp body 510 and a threaded stud, a first end of the clamp body 510 capturing a first end of the threaded stud, the second end of the threaded stud being threaded to securely hold a second of the clamp body 510, wherein the clamp 500 securely surrounds the die as the threaded stud draws the first end and the second end of the clamp body 510 together.

FIG. 18 illustrates a method 2000 for forming a wick, such as an annular wick. The method 2000 comprises forming the plurality of layers of wick material 1400 around the elongate rod 1300 at step 2002. The method 2000 comprises placing the elongate rod 1300 and the plurality of layers of wick material 1400 between the first die portion 1210 and the second die portion 1220 of the annular die assembly 1200. The method 2000 further comprises bringing the first die portion 1210 and the second die portion 1220 together to position the elongate rod 1300 and the plurality of layers of wick material 1400 within the central die opening 1230 (see FIG. 8) of the annular die assembly 1200 at step 2004. The method 2000 further comprises placing the elongate rod 1300, the plurality of layers of wick material 1400, and the annular die assembly 1200 between the first clamp portion 1110 and the second clamp portion 1120 of the clamps 1100. The method 2000 further comprises attaching the first clamp portion 1110 and the second clamp portion 1120 of each the one or more clamps 1100 together to position the elongate rod 1300, the plurality of layers of wick material 1400, and the annular die assembly 1200, at least partially, within the central clamp opening 1140 of each of the one or more clamps 1100 at step 2006. The first clamp portion 1110 and the second clamp portion 1120 are attached to each other, as described above, to hold the elongate rod 1300, the plurality of layers of wick material 1400, and the annular die assembly together 1200.

Further to the above, once the tooling 1000 is assembled around the plurality of layers of wick material 1400, the tooling 1000 and the wick material 1400 may be heated to a temperature sufficient to thermally expand the elongate rod 1300 toward the central die opening 1230 of the annular die assembly 1200 to compress the plurality of layers of wick material 1400 between the elongate rod 1300 and the central die opening 1230 of the annular die assembly 1200 at step 2008. In at least one aspect, the plurality of layers of wick material 1400 are compressed between a minimum amount where no voids are defined between layers of the plurality of layers of wick material 1400 and a maximum amount permitted by the one or more clamps 1100.

In at least one aspect, the tooling 1000 and the wick material 1400 are placed into a furnace to be heated, such as heated to the sufficient temperature. In at least one aspect, the furnace is a vacuum furnace. In at least one aspect, the furnace is configured to provide a protective atmosphere for the tooling 1000 and the wick material 1400 during heating and cooling operations. In at least one aspect, the protective atmosphere is an inert gas environment.

Referring again to FIG. 5, an annular gap AG is defined between the first diameter FD of the annular die assembly 1200 and the second diameter SD of the elongate rod 1300 when the elongate rod 1300 and the plurality of layers of wick material 1400 are positioned in the central clamp opening 1140 of the one or more clamps 1100. In various aspects, as the tooling 1000 is heated to the sufficient temperature, the differing thermal expansion characteristics of the annular die assembly 1200 and the elongate rod 1300 cause the annular gap AG into which the plurality of layers of wick material 1400 are positioned to shrink by a predetermined amount. When the annular gap AG shrinks by the predetermined amount, the plurality of layers of wick material 1400 are compressed to bond the plurality of layers of wick material 1400 together.

Further to the above, in at least one aspect, the annular gap AG is greater than or equal to the radial thickness RT (see FIGS. 5 and 10) of the plurality of layers of wick material 1400 prior to heating the tooling 1000 (e.g., when the tooling 1000 is at room temperature). In at least one aspect, the predetermined amount in which the annular gap AG shrinks is between zero and the radial thickness RT of the plurality of layers of wick material 1400. In at least one aspect, when the tooling 1000 and the wick material 1400 are heated to the sufficient temperature, the first diameter FD of the central die opening 1230 of the annular die assembly 1200 and the second diameter SD of the elongate rod 1300 are equal to each other. In various aspects, the compressive forces applied to the plurality of layers of wick material 1400 during heating is constant and radially uniform to ensure effective diffusion bonding is achieved between the multiple individual layers of the plurality of layers of wick material 1400.

Further to the above, in at least one aspect, a film layer may be wrapped around the second diameter SD of the elongate rod 1300 prior to wrapping the plurality of layers of wick material 1400 around the elongate rod 1300. In at least one aspect, the film layer comprises at least one of a ceramic, a metallic, a refractory alloy, molybdenum, a titanium-zirconium-molybdenum (TZM), or combinations thereof. In various aspects, the film layer acts to both achieve compression of the wick material 1400 at diffusion bonding temperatures and prevent the plurality of layers of wick material 1400 from bonding to the elongate rod 1300 at elevated temperatures.

Further to the above, in at least one aspect, a die interface 1250 (see FIG. 5) between the first die portion 1210 and the second die portion 1220 of the annular die assembly 1200 is aligned with a clamp interface 1150 (see FIG. 5) between the first clamp portion 1110 and the second clamp portion 1120 of the clamp 1100. However, in certain instances, the annular die assembly 1200 need not be oriented in this manner and may be seated in the central clamp opening 1140 of the clamp 1100 such that the interfaces 1250, 1150 of the annular die assembly 1200 and the clamp 1100 are not aligned.

Further to the above, in at least one aspect, very long wicks (e.g., of approximately twelve feet) can be produced either by making the clamps 1100 longer in axial length or by arranging multiple shorter length clamps 1100 end to end. When multiple clamps 1100 are arranged, the elongate rod 1300 and the annular die assembly 1200 may be made of alternating lengths to stagger the placement of butt joints between the elongate rod 1300 and the annular die assembly 1200. This alternating pattern is akin to the technique of a mason laying bricks.

Further to the above, multiple shorter length wicks can be formed and then joined together in a subsequent operation with the tooling 1000. In such instances, a slug or rod would be inserted into the inside diameters of the formed wicks, this region would then be positioned within the central die opening 1230 of the annular die assembly 1200 and placed into a furnace and heated to join the end of two separate wicks. In various aspects, when joining shorter wicks the ends of the wicks may directly overlap, the ends of the wicks may be cut to create lap joints, butt-joints, or other interlocking geometries that are cut into the wicks and then shaped during rolling by way of the tooling 1000.

Finally, more complex wick geometries can be achieved by incorporating features into the elongate rod 1300 and/or the annular die assembly 1200. For example, an inner surface 1234 (see FIG. 8) of the central die opening 1230 of the annular die assembly 1200 could include dimples, ridges, fins, or other geometric shapes that may be desirable for a particular application. Further, the outside diameter (e.g., the second diameter SD shown in FIG. 10) of the elongate rod 1300 could include dimples, ridges, fins, or other geometric shapes that may be desirable for a particular application. In at least one aspect, the dimples, ridges, fins, or other geometric shapes of the central die opening 1230 and the outside diameter of the elongate rod 1300 may nest inside each other when the elongate rod 1300 is positioned in the annular die assembly 1200. In any event, during forming and bonding operations, the features on the elongate rod 1300 and/or the annular die assembly 1200 would be formed into the wick as the elongate rod 1300 radially expands toward the annular die assembly 1200 during heating, as discussed above.

Various aspects of the present disclosure include, but are not limited to, the aspects listed in the following numbered clauses.

Clause 1—A method of forming an annular wick for a heat pipe, the method including: forming a plurality of layers of wick material around an elongate rod; placing the elongate rod and the plurality of layers of wick material into a central die opening of an annular die assembly; placing the elongate rod, the plurality of layers of wick material, and the annular die assembly into a central clamp opening of a clamp, wherein the clamp is configured to hold the elongate rod, the plurality of layers of wick material, and the annular die assembly together; and heating the elongate rod, the plurality of layers of wick material, the annular die assembly, and the clamp to a temperature sufficient to thermally expand the elongate rod toward the central die opening of the annular die assembly to compress the plurality of layers of wick material between the elongate rod and the central die opening of the annular die assembly.

Clause 2—The method of Clause 1, where the elongate rod includes a first material having a first coefficient of thermal expansion, where the annular die assembly includes a second material having a second coefficient of thermal expansion that is less than the first coefficient of thermal expansion.

Clause 3—The method of Clause 1 or 2, where the plurality of layers of wick material are compressed between a minimum amount wherein no voids are defined between layers of the plurality of layers of wick material and a maximum amount permitted by the clamp.

Clause 4—The method of any one of Clauses 1-3, where the clamp includes a first clamp portion and a second clamp portion that define the central clamp opening for receiving the elongate rod, the plurality of layers of wick material, and the annular die assembly, the method including attaching the first clamp portion and the second clamp portion together to hold the elongate rod, the plurality of layers of wick material, and the annular die assembly together.

Clause 5—The method of Clause 4, where attaching the first clamp portion to the second clamp portion includes mechanically fastening one of the first clamp portion and the second clamp portion to the other of the first clamp portion and the second clamp portion.

Clause 6—The method of Clause 1 or 2, where the clamp includes a clamp body and a threaded stud, a first end of the clamp body capturing a first end of the threaded stud, the second end of the threaded stud being threaded to securely hold a second of the clamp body, where the clamp securely surrounds the die as the threaded stud draws the first end and the second end of the clamp body together.

Clause 7—The method any one of Clauses 2-5, where the clamp includes a third material having a third coefficient of thermal expansion that is less than the first coefficient of thermal expansion.

Clause 8—The method of Clause 1, where the annular die assembly includes a first die portion defining a first arcuate opening and a second die portion defining a second arcuate opening, where the first arcuate opening and the second arcuate opening form the central die opening between the first die portion and the second die portion for receiving the elongate rod and the plurality of layers of wick material.

Clause 9—The method of Clause 1, where forming the plurality of layers of wick material around the elongate rod includes wrapping a sheet of wick material around an outside diameter of the elongate rod.

Clause 10—The method of Clause 1, further including wrapping a layer of film around the elongate rod prior to forming the plurality of layers of wick material around the elongate rod.

Clause 11—The method of Clause 1, further including coating the elongate rod with a fourth material prior to forming the plurality of layers of wick material around the elongate rod, where the fourth material comprises at least one of a ceramic, a refractory alloy, or a metallic.

Clause 12—The method of Clause 1, further including coating the central die opening of the annular die assembly with a fifth material including at least one of a ceramic, a refractory alloy, or a low thermal expansion alloy.

Clause 13—The method of Clause 1, further including: aligning a plurality of elongate rods to form an extended rod; and aligning a plurality of annular dies to form an extended die, where each end of each of the elongate rods is offset from each end of each of the annular dies to create a stagger.

Clause 14—The method of Clause 1, further including: joining pairwise a plurality of the formed wicks by: inserting a slug into the inside diameters of two of the plurality of formed wicks; positioning the adjacent ends of the two formed wicks withing the central die opening of the annular die assembly; and heating the adjacent ends to join the two wicks.

Clause 15—The method of Clause 14, further including cutting, before joining, each of the adjacent ends to create an interlocking geometry.

Clause 16—The method of Clause 15, where the interlocking geometry includes a lap joint or a butt joint.

Clause 17—Tooling for forming an annular wick from a plurality of layers of wick material, the tooling including: a clamp, including: a first clamp portion defining a first arcuate clamp opening; and a second clamp portion defining a second arcuate clamp opening, the first clamp portion and the second clamp portion are attachable to each other such that the first arcuate clamp opening and the second arcuate clamp opening form a central clamp opening of the clamp; an annular die assembly positionable in the central clamp opening, the annular die assembly including: a first die portion defining a first arcuate die opening; and a second die portion defining a second arcuate die opening, where the first die portion and the second die portion are positionable together such that the first arcuate die opening and the second arcuate die opening form a central die opening of the annular die assembly; and an elongate rod positionable in the central die opening, where the plurality of layers of wick material are configured to be wrapped around the elongate rod to position the plurality of layers of wick material intermediate the elongate rod and the central die opening, and where the elongate rod comprises a first material having a first coefficient of thermal expansion and the annular die assembly includes a second material having a second coefficient of thermal expansion that is less than the first coefficient of thermal expansion.

Clause 18—The tooling of Clause 17, where the plurality of layers of wick material define a radial thickness, where the central die opening defines a first diameter and the elongate rod defines a second diameter, where an annular gap is defined between the first diameter and the second diameter when the elongate rod is positioned in the central opening, and where the annular gap is greater than or equal to the radial thickness of the plurality of layers of wick material.

Clause 19—The tooling of Clause 17, where the second material includes a ceramic, a metallic, a refractory alloy, molybdenum, titanium-zirconium-molybdenum, or a combination thereof.

Clause 20—The tooling of Clause 17, where at least one of the first arcuate die opening or the second arcuate die opening includes a die coating thereon, and wherein the die coating includes at least one of a ceramic coating, a metallic coating, a refractory alloy coating, a molybdenum coating, a titanium-zirconium-molybdenum coating, or a combination thereof.

Clause 21—The tooling of Clause 17, wherein the first material includes at least one of stainless steel, titanium, aluminum alloy, or a combination thereof.

Clause 22—The tooling of Clause 17, where the elongate rod includes a rod coating thereon, where the rod coating includes at least one of a ceramic coating, a metallic coating, a refractory alloy coating, a molybdenum coating, a titanium-zirconium-molybdenum coating, or a combination thereof.

Clause 23—The tooling of Clause 17, further including a film layer wrapped around the elongate rod intermediate the plurality of layers of wick material and the elongate rod.

Clause 24—The tooling of Clause 23, where the film layer includes at least one of a ceramic, a metallic, a refractory alloy, a molybdenum coating, a titanium-zirconium-molybdenum coating, or a combination thereof.

Clause 25—The tooling of Clause 17, where the clamp includes a third material including at least one of a ceramic, a metallic, a refractory alloy, a nickel-based alloy. Alloy 42, Invar 36, molybdenum, titanium-zirconium-molybdenum, or a combination thereof.

Clause 26—The tooling of Clause 17, where the first clamp portion and the second clamp portion are attached to each other by way of at least one mechanical fastener.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present disclosure has been described with reference to various exemplary and illustrative aspects. The aspects described herein are understood as providing illustrative features of varying detail of various aspects of the disclosed disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed disclosure. Accordingly, it will be recognized by persons having ordinary skill in the art that various substitutions, modifications or combinations of any of the exemplary aspects may be made without departing from the scope of the disclosure. In addition, persons skilled in the art will recognize, or be able to ascertain using no more than routine experimentation, many equivalents to the various aspects of the disclosure described herein upon review of this specification. Thus, the disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A method of forming an annular wick for a heat pipe, the method comprising:
   forming a plurality of layers of wick material around an elongate rod;
   placing the elongate rod and the plurality of layers of wick material into a central die opening of an annular die assembly;
   placing the elongate rod, the plurality of layers of wick material, and the annular die assembly into a central clamp opening of a clamp, wherein the clamp is configured to hold the elongate rod, the plurality of layers of wick material, and the annular die assembly together; and
   heating the elongate rod, the plurality of layers of wick material, the annular die assembly, and the clamp to a temperature sufficient to thermally expand the elongate rod toward the central die opening of the annular die assembly to compress the plurality of layers of wick material between the elongate rod and the central die opening of the annular die assembly.

2. The method of claim 1, wherein the elongate rod comprises a first material having a first coefficient of thermal expansion, wherein the annular die assembly comprises a second material having a second coefficient of thermal expansion that is less than the first coefficient of thermal expansion.

3. The method of claim 2, wherein the clamp comprises a third material having a third coefficient of thermal expansion that is less than the first coefficient of thermal expansion.

4. The method of claim 1, wherein the plurality of layers of wick material are compressed between a minimum amount wherein no voids are defined between layers of the plurality of layers of wick material and a maximum amount permitted by the clamp.

5. The method of claim 1, wherein the clamp comprises a first clamp portion and a second clamp portion that define the central clamp opening for receiving the elongate rod, the plurality of layers of wick material, and the annular die assembly, the method comprising attaching the first clamp portion and the second clamp portion together to hold the elongate rod, the plurality of layers of wick material, and the annular die assembly together.

6. The method of claim 5, wherein attaching the first clamp portion to the second clamp portion comprises mechanically fastening one of the first clamp portion and the second clamp portion to the other of the first clamp portion and the second clamp portion.

7. The method of claim 1, wherein the clamp comprises a clamp body and a threaded stud, a first end of the clamp body capturing a first end of the threaded stud, the second end of the threaded stud being threaded to securely hold a second of the clamp body, wherein the clamp securely surrounds the die as the threaded stud draws the first end and the second end of the clamp body together.

8. The method of claim 1, wherein the annular die assembly comprises a first die portion defining a first arcuate opening and a second die portion defining a second arcuate opening, wherein the first arcuate opening and the second arcuate opening form the central die opening between the first die portion and the second die portion for receiving the elongate rod and the plurality of layers of wick material.

9. The method of claim 1, wherein forming the plurality of layers of wick material around the elongate rod comprises wrapping a sheet of wick material around an outside diameter of the elongate rod.

10. The method of claim 1, further comprising wrapping a layer of film around the elongate rod prior to forming the plurality of layers of wick material around the elongate rod.

11. The method of claim 1, further comprising coating the elongate rod with a fourth material prior to forming the plurality of layers of wick material around the elongate rod, wherein the fourth material comprises at least one of a ceramic, a refractory alloy, or a metallic.

12. The method of claim 1, further comprising coating the central die opening of the annular die assembly with a fifth material comprising at least one of a ceramic, a refractory alloy, or a low thermal expansion alloy.

13. The method of claim 1, further comprising:
aligning a plurality of elongate rods to form an extended rod; and
aligning a plurality of annular die assemblies to form an extended annular die assembly,
wherein each end of each of the elongate rods is offset from each end of each of the annular die assemblies to create a stagger.

14. The method of claim 1, wherein the plurality of layers of wick material that have been compressed form a first wick, the method further comprising:
joining pairwise the first wick with a second wick by:
inserting a slug into the inside diameters of the first wick and the second wick;
positioning adjacent ends of the first wick and the second wick within the central die opening of the annular die assembly; and
heating the adjacent ends to join the first wick and the second wick.

15. The method of claim 14, further comprising:
cutting, before joining, each of the adjacent ends to create an interlocking geometry.

16. The method of claim 15, wherein the interlocking geometry comprises a lap joint or a butt joint.

17. A method of forming an annular wick for a heat pipe, the method comprising:
forming a plurality of layers of wick material around an elongate rod, the elongate rod defining an outside diameter;
placing the elongate rod and the plurality of layers of wick material into a central die opening of an annular die assembly, the central die opening defining an inside diameter;
placing the elongate rod, the plurality of layers of wick material, and the annular die assembly into a central clamp opening of a clamp, wherein the clamp is configured to hold the elongate rod, the plurality of layers of wick material, and the annular die assembly together, wherein an annular gap is defined between the inside diameter of the annular die assembly and the outside diameter of the elongate rod based on the elongate rod and the plurality of layers of wick material being positioned in the central die opening; and
heating the elongate rod, the plurality of layers of wick material, the annular die assembly, and the clamp to thermally expand the elongate rod toward the central die opening of the annular die assembly such that the annular gap shrinks a predetermined amount to compress the plurality of layers of wick material between the elongate rod and the central die opening of the annular die assembly.

18. The method of claim 17, wherein the elongate rod comprises a first material having a first coefficient of thermal expansion, wherein the annular die assembly comprises a second material having a second coefficient of thermal expansion that is less than the first coefficient of thermal expansion.

19. The method of claim 18, wherein the clamp comprises a third material having a third coefficient of thermal expansion that is less than the first coefficient of thermal expansion.

20. The method of claim 19, wherein the annular gap is greater than or equal to a radial thickness of the plurality of layers of wick material formed around the elongate rod prior to heating.

21. The method of claim 20, wherein the predetermined amount is between zero and the radial thickness of the plurality of layers of wick material.

* * * * *